United States Patent
Jo et al.

(10) Patent No.: US 6,957,156 B2
(45) Date of Patent: Oct. 18, 2005

(54) METHOD FOR SEARCHING FOR DIP ANGLE USING TILT-COMPENSATED ELECTRONIC COMPASS

(75) Inventors: Han Chul Jo, Kyungki-do (KR); Won Tae Choi, Kyungki-do (KR); Chang Hyun Kim, Kyungki-do (KR); Jin Yong Kang, Kyungki-do (KR); Oh Jo Kwon, Kyungki-do (KR); Ha Woong Jeong, Inchun (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 10/770,503

(22) Filed: Feb. 4, 2004

(65) Prior Publication Data

US 2005/0143917 A1 Jun. 30, 2005

(30) Foreign Application Priority Data

Dec. 13, 2003 (KR) .................... 10-2003-0091011

(51) Int. Cl.$^7$ ............................................. G01F 17/00
(52) U.S. Cl. .......................................... 702/51; 33/356
(58) Field of Search ................... 702/151, 9; 33/302, 33/304, 355 R, 355 D, 356, 361, 1 E; 175/61; 455/566; 701/224; 324/252; 348/85

(56) References Cited

U.S. PATENT DOCUMENTS

| | | | | |
|---|---|---|---|---|
| RE33,708 E | * | 10/1991 | Roesler | 33/304 |
| 5,095,631 A | * | 3/1992 | Gavril et al. | 33/361 |
| 6,701,631 B1 | * | 3/2004 | Monteiro et al. | 33/1 E |
| 2002/0100178 A1 | * | 8/2002 | Smith et al. | 33/356 |
| 2003/0023380 A1 | * | 1/2003 | Woloszyk et al. | 701/224 |
| 2003/0134665 A1 | * | 7/2003 | Kato et al. | 455/566 |

* cited by examiner

Primary Examiner—Michael Nghiem
Assistant Examiner—Xiuqin Sun
(74) Attorney, Agent, or Firm—Lowe Hauptman & Berner, LLP (57) ABSTRACT

A method of finding a dip angle in a tilt-compensated electronic compass includes the steps of a) setting a predetermined azimuth angle indicative of a horizontal status of a geomagnetic sensor to a reference azimuth angle; b) if the compass is slightly tilted, stepwise-increasing a dip angle within a predetermined dip angle search range, and calculating azimuth angles associated with individual dip angles; c) comparing the calculated azimuth angles with the reference azimuth angle, and finding one azimuth angle, which is closest to the reference azimuth angle, among the calculated azimuth angles; and d) setting the dip angle applied to the closest azimuth angle to a specific dip angle associated with a corresponding azimuth angle, such that a more accurate azimuth angle can be detected by the on the basis of the calculated dip angle.

4 Claims, 6 Drawing Sheets

PRIOR ART

FIG. 1a

PRIOR ART

FIG. 1b

PRIOR ART

FIG. 2

PRIOR ART

FIG. 3a

PRIOR ART

FIG. 3b

PRIOR ART

METHOD FOR SEARCHING FOR DIP ANGLE USING TILT-COMPENSATED ELECTRONIC COMPASS

BACKGROUND OF THE INVENTION

1. Field of the Invention

The present invention relates to a method for searching for a dip angle using a tilt-compensated electronic compass, and more particularly to a method for searching for a dip angle using a tilt-compensated electronic compass, which finds a dip angle suitable for current environments before detecting an azimuth angle, and thereby acquires a more accurate azimuth angle from the electronic compass having a two-axis geomagnetic sensor on the basis of the found dip angle.

2. Description of the Related Art

In recent times, there have been developed small-sized and low-priced geomagnetic sensor modules. With the increasing development of MEMS (Micro-Electro Mechanical Systems) technology, chip-sized geomagnetic sensor modules have been newly developed and used for a variety of applications. However, there is a need for a specific application for preventing the geomagnetic sensor from being horizontally maintained to consider a dip angle (i.e., a magnetic dip angle) corresponding to an inclination angle, resulting in difficulty in calculating a correct azimuth angle using only the two-axis geomagnetic sensor.

Therefore, the above specific application where the geomagnetic sensor is not horizontally maintained must compensate for a tilted or inclined status to provide a horizontal status, and must detect an azimuth angle in the horizontal status. For this purpose, a two-axis geomagnetic sensor and an acceleration sensor for detecting the degree of tilt or inclination must be used at the same time to compensate for an azimuth error by converting a tilted coordinate into a horizontal coordinate.

Figure 1A:
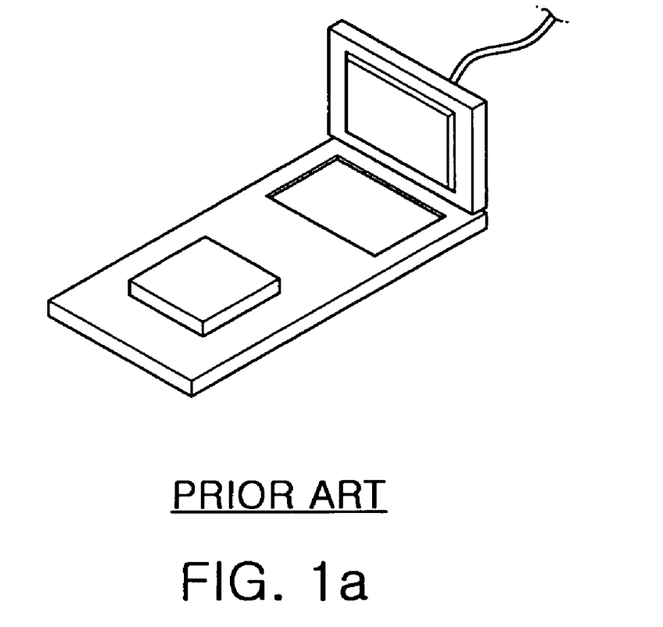
FIG. 1a is a perspective view illustrating a three-axis geomagnetic sensor for use in a conventional electronic compass.
Figure 1B:
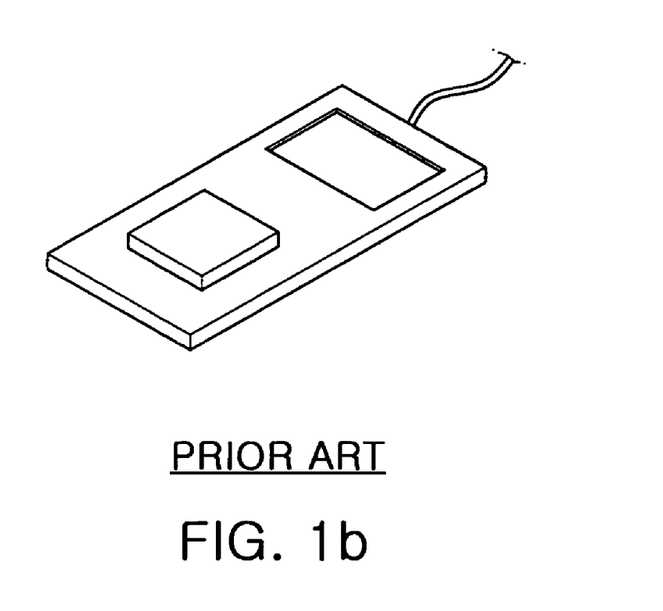
FIG. 1b is a perspective view illustrating a two-axis geomagnetic sensor for use in the conventional electronic compass.

FIG. 1a is a perspective view illustrating a general three-axis geomagnetic senor and FIG. 1b is a perspective view illustrating a general two-axis geomagnetic sensor.

The three-axis geomagnetic sensor shown in FIG. 1a has a limitation in its installation space, such that it is difficult for the three-axis geomagnetic sensor to be applied to small-sized multimedia devices, etc. Therefore, there have been recently developed and investigated a variety of methods for compensating for the tilted coordinate using the two-axis geomagnetic sensor shown in FIG. 1b.

Figure 2:
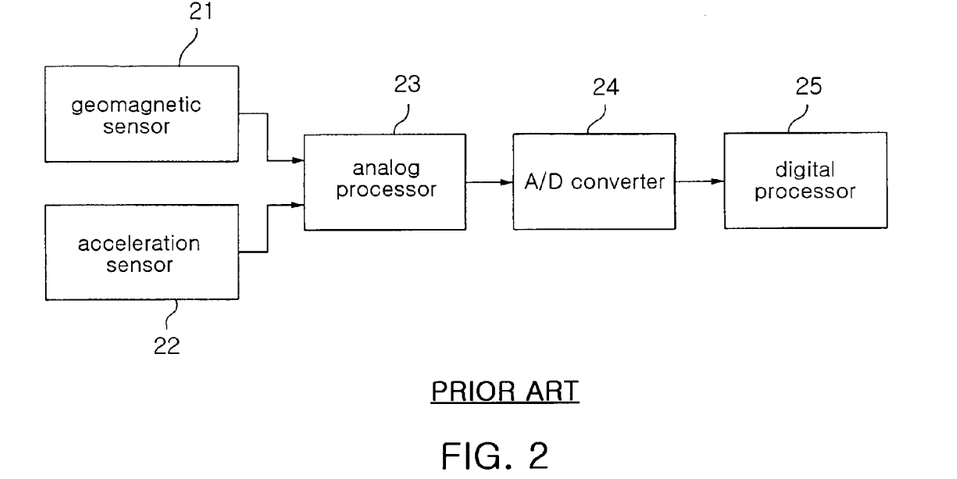
FIG. 2 is a block diagram illustrating a two-axis geomagnetic sensor for use in the conventional electronic compass.

FIG. 2 is a block diagram illustrating a two-axis geomagnetic sensor for use in a conventional electronic compass.

Referring to FIG. 2, the two-axis geomagnetic sensor for use in the conventional electronic compass includes a geomagnetic sensor 21 for detecting a geomagnetic azimuth angle; an acceleration sensor 22 for detecting a tilted geomagnetic angle on the basis of the horizon; an analog processor 23 for amplifying signals detected by the sensors 21 and 22, and filtering the amplified signals; an analog/digital (A/D) converter 24 for converting the output signal of the analog processor 23 into a digital signal; and a digital processor 25 for calculating a geomagnetic azimuth angle on the basis of the digital signal received from the A/D converter 24.

In this case, the geomagnetic sensor 21 is a prescribed sensor for detecting/measuring the earth's magnetic field intensity, and includes x-axis, and y-axis sensors arranged at right angles to each other.

A method for compensating for the tilted angle in the above-identified conventional electronic compass will hereinafter be described.

The conventional electronic compass must compensate for the tilted coordinate to be changed to the horizontal coordinate using the following Equation 1 serving as a coordinate conversion equation between the tilted coordinate and the horizontal coordinate and the following Equation 2 serving as a coordinate conventions matrix.

Figure 3A:
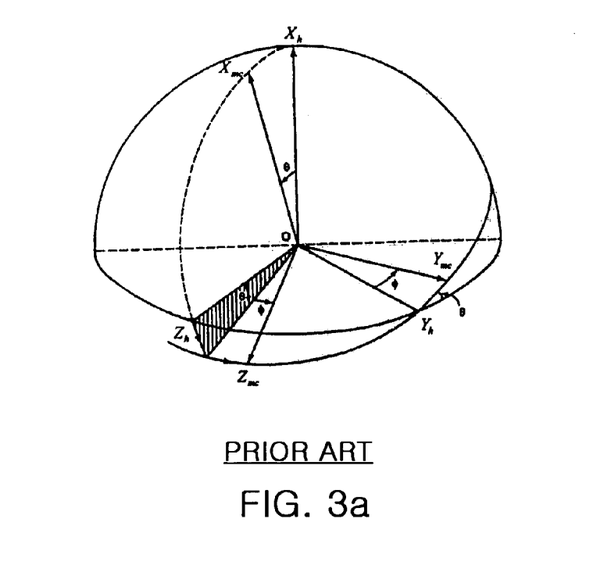
FIG. 3a is a conceptual diagram illustrating the relationship between the horizontal coordinate and the tilted coordinate.

FIG. 3a is a conceptual diagram illustrating the relationship between the horizontal coordinate and the tilted coordinate. Referring to FIG. 3a, "θ" is a tilted angle of the x-axis of the horizontal coordinate, and "φ" is a tilted angle of the y-axis of the horizontal coordinate. "Xh", "Yh", and "Zh" are individual values of the horizontal coordinate, and "Xmc", "Ymc", and "Zmc" are individual values of the tilted coordinate.

$$\begin{bmatrix} Xh \\ Yh \\ Zh \end{bmatrix} = C_b^h \begin{bmatrix} Xmc \\ Ymc \\ Zmc \end{bmatrix} \quad [\text{Equation 1}]$$

$$C_b^h = \begin{bmatrix} \cos\theta & \sin\theta\sin\phi & \sin\theta\cos\phi \\ 0 & \cos\psi & -\sin\phi \\ -\sin\theta & \cos\theta\sin\phi & \cos\theta\cos\phi \end{bmatrix} \quad [\text{Equation 2}]$$

The following Equation 3 is adapted to calculate an the azimuth angle "Ψ". The "Xmc", "Ymc", and "Zmc" values and the "θ" and "φ" angles are needed to calculate the azimuth angle "Ψ". The "θ" and "φ" angles are detected by a two-axis acceleration sensor, and the "Xmc" and "Ymc" values are detected by a two-axis geomagnetic sensor, however, the above two-axis sensors cannot calculate the "Zmc" value.

$$\psi - \tan^{-1}\left(\frac{Yh}{Xh}\right) = \tan^{-1}\left(\frac{-Ymc \cdot \cos\phi + Zmc \cdot \sin\phi}{Xmc \cdot \cos\theta + Ymc \cdot \sin\theta\sin\phi + Zmc \cdot \sin\theta\cos\phi}\right) \quad [\text{Equation 3}]$$

The following Equation 4 describes the "θ" and "φ" angles detected by the acceleration sensor.

$$\phi = \sin^{-1}(ax/g)$$

$$\theta = \sin^{-1}(ay/g) \quad [\text{Equation 4}]$$

With reference to the above Equation 4, "g" is acceleration due to gravity, "ax" is an x-axis component of the acceleration sensor, and "ay" is a y-axis component of the acceleration sensor.

The following Equation 5 is acquired from the aforementioned Equations 2 and 3, and requires a specific value "Zh" to obtain the "Zmc" value using the above Equation 5.

$$Zmc = \frac{Zh + Xmc \cdot \sin\theta - Ymc \cdot \sin\phi\cos\theta}{\cos\phi\cos\theta} \quad [\text{Equation 5}]$$

Figure 3B:
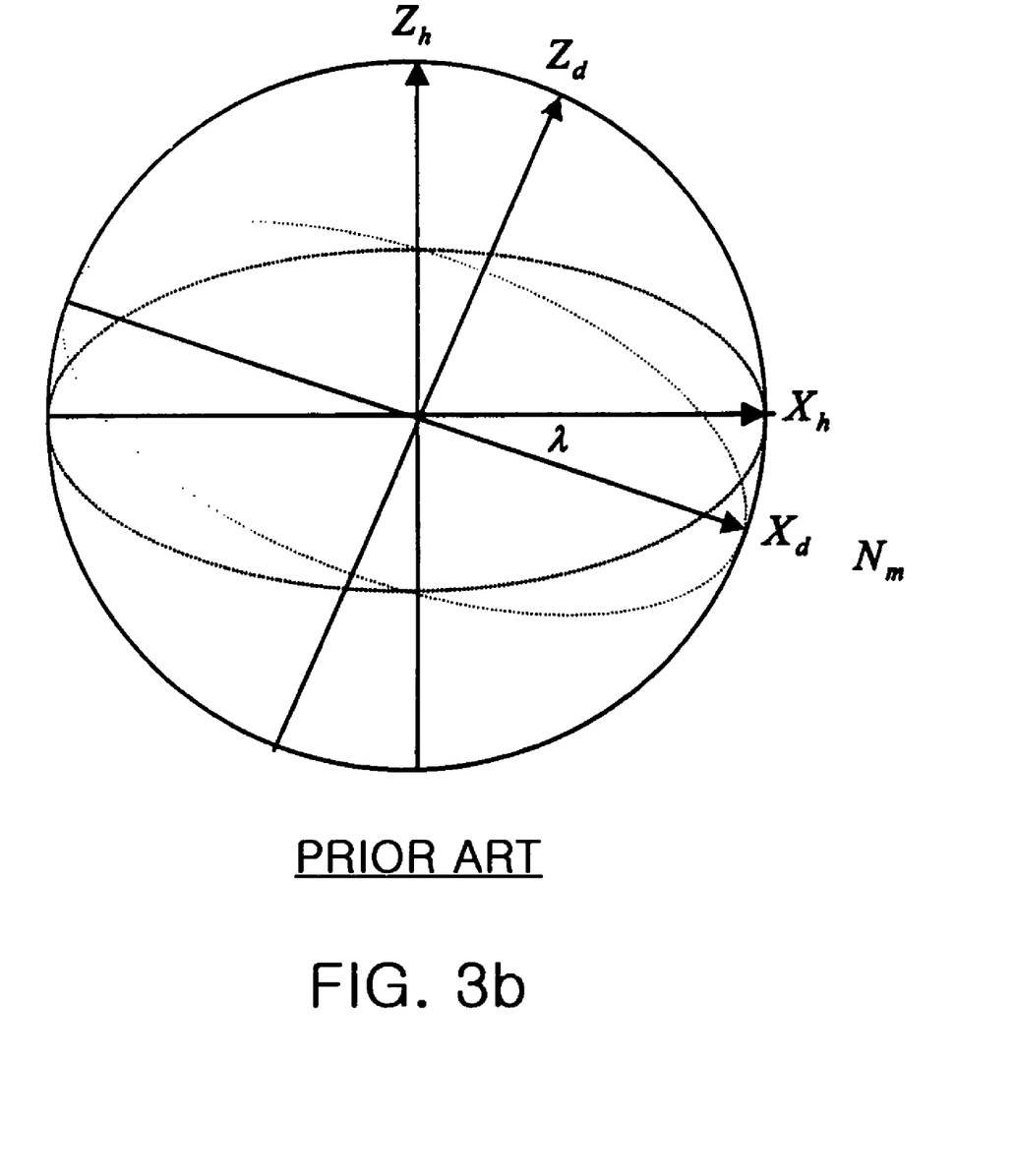
FIG. 3b is a conceptual diagram illustrating the relationship between the geomagnetic field and the horizontal coordinate.

FIG. 3b is a conceptual diagram illustrating the relationship between the geomagnetic field and the horizontal coordinate. Referring to FIG. 3b, "Xh", "Yh", and "Zh" are individual values of the horizontal coordinate, "Xd", "Yd", and "Zd" are individual values of the geomagnetic field, "Nm" is magnetic north, and "λ" is a specific angle (i.e., a dip angle) made between the geomagnetic field and the horizontal coordinate.

The following Equation 6 is adapted to describe the relationship between the geomagnetic field and the horizontal coordinate. The following Equation 7 is adapted to describe a reference coordinate of the geomagnetic field. The following Equation 8 is acquired from the above Equations 6 and 7.

$$\begin{bmatrix} Xd \\ Yd \\ Zd \end{bmatrix} = \begin{bmatrix} \cos\lambda & 0 & \sin\lambda \\ 0 & 0 & 0 \\ -\sin\lambda & 0 & \cos\lambda \end{bmatrix} \begin{bmatrix} Xh \\ Yh \\ Zh \end{bmatrix} \quad \text{[Equation 6]}$$

$$\begin{bmatrix} Xd \\ Yd \\ Zd \end{bmatrix} = \begin{bmatrix} 1 \\ 0 \\ 0 \end{bmatrix} \quad \text{[Equation 7]}$$

$$Zh = \sin\lambda \quad \text{[Equation 8]}$$

Provided that the "λ" value is recognized, the "Zmc" value can be calculated by the above Equations 5 and 8, and a tilt-compensated azimuth angle can also be calculated using only the two-axis geomagnetic sensor.

The above-identified conventional method calculates the azimuth angle using the dip angle "λ" predetermined experimentally, such that it can substitute for the three-axis geomagnetic sensor.

Figure 4:
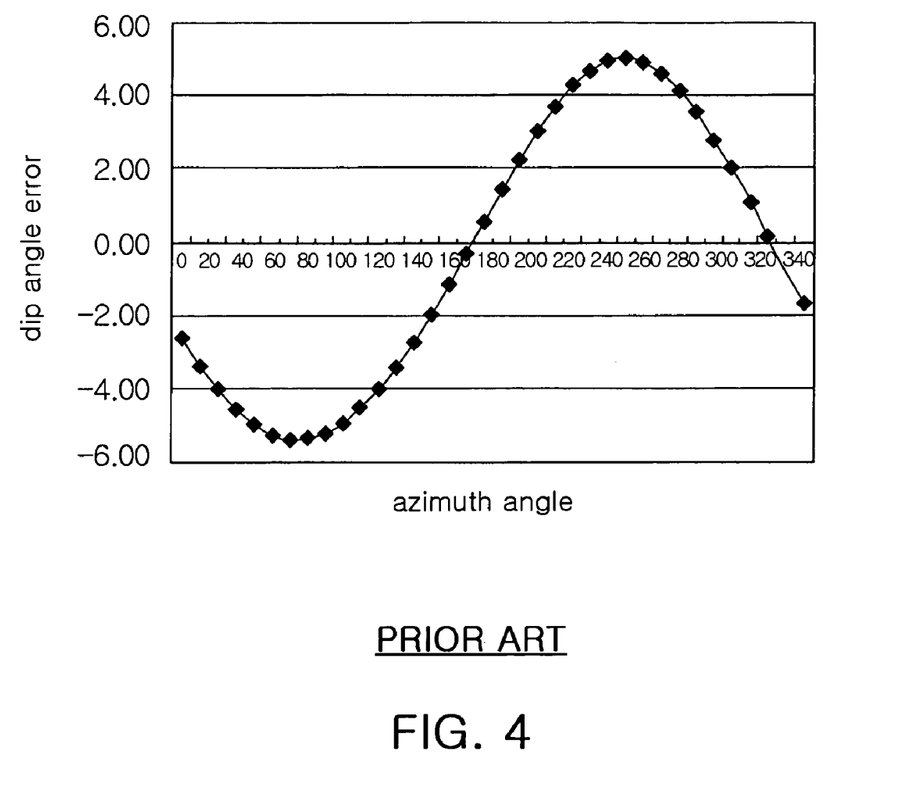
FIG. 4 is a graph illustrating a dip angle error generated by a conventional method for searching for a dip angle.

However, the aforementioned method has a disadvantage in that it cannot consider the fact that a dip angle created indoors is different from the other dip angle created outdoors within the range of a specific area having the same dip angle, such that the scope range of an error rate of the dip angle is set to ±6.0 according to the azimuth angle as shown in FIG. 4, resulting in deteriorated accuracy in response to the influence of peripheral magnetic substances.

SUMMARY OF THE INVENTION

Therefore, the present invention has been made in view of the above problems, and it is an object of the present invention to provide a method for searching for a dip angle using a tilt-compensated electronic compass, which finds a dip angle suitable for current environments before detecting an azimuth angle, and thereby acquires a more accurate azimuth angle from the electronic compass having a two-axis geomagnetic sensor on the basis of the found dip angle.

In accordance with the present invention, the above and other objects can be accomplished by the provision of a method for finding an optimal dip angle in a prescribed environment using an electronic compass containing a two-axis geomagnetic sensor, comprising the steps of: a) setting a predetermined azimuth angle indicative of a horizontal status of a geomagnetic sensor to a reference azimuth angle "Ψref"; b) if the electronic compass is slightly tilted on the basis of the reference azimuth angle "Ψref", stepwise-increasing a dip angle "λ" within a predetermined dip angle search range, and calculating azimuth angles "Ψmi" associated with individual dip angles; c) comparing the calculated azimuth angles "Ψmi" with the prescribed reference azimuth angle "Ψref", and finding one azimuth angle, which is the closest to the reference azimuth angle "Ψref", from among the calculated azimuth angles "Ψmi"; and d) setting the dip angle "λ" applied to the found azimuth angle to a specific dip angle associated with a corresponding azimuth angle.

A digital processor for use in the aforementioned method for finding the optimal dip angle in a prescribed environment using the electronic compass containing the two-axis geomagnetic sensor, sets a predetermined azimuth angle indicative of a horizontal status of a geomagnetic sensor to a reference azimuth angle "Ψref"; if the electronic compass is slightly tilted on the basis of the reference azimuth angle "Ψref", stepwise-increases a dip angle "λ" within a predetermined dip angle search range, and calculates azimuth angles "Ψmi" associated with individual dip angles; compares the calculated azimuth angles "Ψmi" with the prescribed reference azimuth angle "Ψref", and finds one azimuth angle, which is the closest to the reference azimuth angle "Ψref", from among the calculated azimuth angles "Ψmi"; and sets the dip angle "λ" applied to the found azimuth angle to a specific dip angle associated with a corresponding azimuth angle.

Preferably, the digital processor may stepwise-increases the dip angle by approximately 1° within a range from −90° to +90° (i.e., a dip angle search range of approximately "±90°") to calculate azimuth angles associated with individual dip angles.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments in accordance with the present invention will be described in detail with reference to the accompanying drawings. In the drawings, the same or similar elements are denoted by the same reference numerals even though they are depicted in different drawings.

The electronic compass according to the present invention finds a dip angle suitable for current environments before detecting an azimuth angle, and thereby acquires a more accurate azimuth angle from the electronic compass having a two-axis geomagnetic sensor on the basis of the found dip angle. The detailed description of the above electronic compass will hereinafter be described with reference to FIGS. 5 and 6.

The electronic compass containing the two-axis geomagnetic sensor must use the above Equation 3 to acquire the azimuth angle $\Psi$, and requires the "Zmc" value to obtain a correct azimuth angle $\Psi$.

The aforementioned electronic compass must recognize the "sin$\lambda$" value using the above Equations 5 and 8. In more detail, the electronic compass according to the present invention calculates the "sin$\lambda$" value suitable for real environments in order to calculate the correct azimuth angle using the two-axis geomagnetic sensor, differently from the conventional method.

Figure 5:
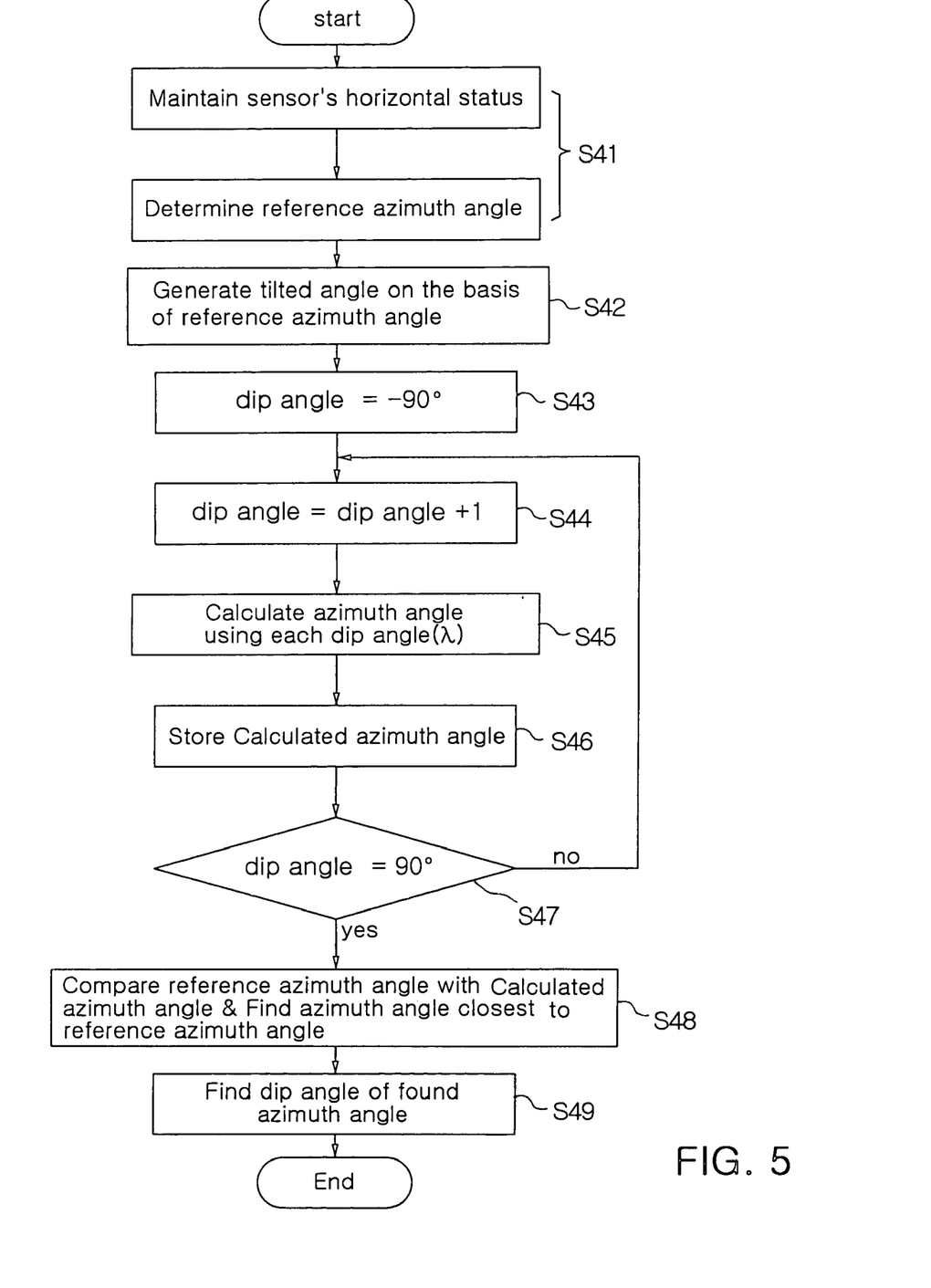
FIG. 5 is a flow chart illustrating a dip angle search method for use in a tilt-compensated electronic compass in accordance with a preferred embodiment of the present invention.

FIG. 5 is a flow chart illustrating a dip angle search method for use in a tilt-compensated electronic compass in accordance with a preferred embodiment of the present invention.

Referring to FIG. 5, the tilt-compensated electronic compass sets a prescribed azimuth angle indicative of a horizontal status of the geomagnetic sensor to a reference azimuth angle "$\Psi$ref" at step S41. In more detail, the electronic compass cannot find a correct azimuth angle on the condition that a dip angle is not equal to a correct dip angle appropriate for current environments, such that it calculates and detects an azimuth angle in the horizontal status having no tilted angle in order to find the correct dip angle, and thereby sets the detected azimuth angle to the reference azimuth angle "$\Psi$ref" at step S41.

If the electronic compass is slightly tilted on the basis of the reference azimuth angle "$\Psi$ref" at step S42, the electronic compass stepwise increases the dip angle "$\lambda$" within the predetermined dip angle search range at steps S43~S44, calculates azimuth angles "$\Psi$mi" associated with individual dip angles at step S45, and stores the calculated azimuth angles "$\Psi$mi" at step S46. In this case, the predetermined dip angle search range may be set to approximately "±90°" at step S47, and one step for use in the above stepwise-increasing operation of the dip angle "$\lambda$" may be set to approximately 1°.

For example, the electronic compass stepwise increases the dip angle "$\lambda$" by approximately 1° within the range from −90° to +90° (i.e., the dip angle search range) in such a way that an azimuth angle associated with individual dip angle "$\lambda$" is calculated.

In this case, "i" contained in the azimuth angle. "$\Psi$mi" may be set to integers from "1" to "180", and a corresponding azimuth angle associated with the dip angle stepwise-increased by 1° in the range from −90° to +90° may be set to "$\Psi$m1~$\Psi$m180".

The electronic compass compares the calculated azimuth angles "$\Psi$mi" with the prescribed reference azimuth angle "$\Psi$ref", and finds one azimuth angle, which is the closest to the reference azimuth angle "$\Psi$ref", from among the calculated azimuth angles "$\Psi$mi" at step S48. In other words, the electronic compass finds a specific azimuth angle having the lowest deviation on the basis of the reference azimuth angle "$\Psi$ref" from among many azimuth angles "$\Psi$m1~$\Psi$m180".

The electronic compass sets a dip angle "$\lambda$" applied to the found azimuth angle to a prescribed dip angle for a corresponding azimuth angle at step S49. In this way, provided that the electronic compass finds an optimum dip angle suitable for current environments before detecting such an azimuth angle, and sets up the found dip angle, the electronic compass can calculate and acquire a more accurate azimuth angle for every environment.

In the case of calculating the dip angle using the aforementioned method shown in FIG. 5, the electronic compass can greatly reduce the dip angle error rates generated at individual azimuth angles as compared to the conventional electronic compass.

Figure 6:
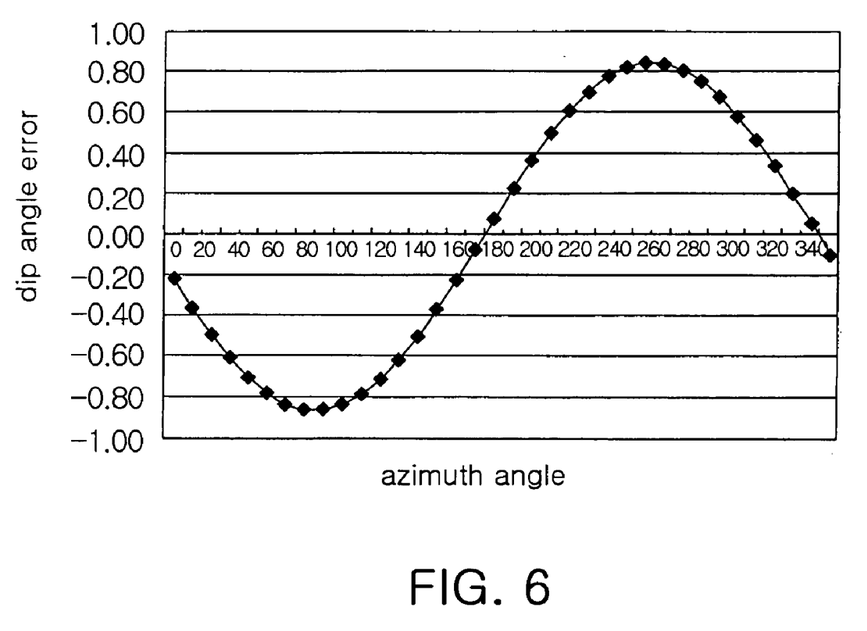
FIG. 6 is a graph illustrating a dip angle error generated by a method for searching for a dip angle in accordance with a preferred embodiment of the present invention.

FIG. 6 is a graph illustrating a dip angle error generated by a method for searching for a dip angle in accordance with a preferred embodiment of the present invention.

Referring to FIG. 6, the y-axis (i.e., a vertical axis) is adapted to indicate dip angle error rates, and the x-axis (i.e., a horizontal axis) is adapted to indicate azimuth angles. The range of the dip angle error rates in association with a specific azimuth angle of approximately 360° is set to approximately "±1°", as can be seen from FIG. 6, such that it can be noted that the electronic compass greatly reduces the dip angle error rate much more than the dip angle error rate "±6" of the conventional electronic compass.

In accordance with the present invention, there is a need for an azimuth angle calculated by the equation for compensating for a tilted angle to be approximately equal to the reference azimuth angle. On the basis of this relationship between the azimuth angle generated in the tilted state and the reference azimuth angle, the electronic compass calculates a reference azimuth angle generated in the case of no tilted angle and a plurality of azimuth angles measured in the case of generating a tilted angle, finds one dip angle, which is the closest to the reference azimuth angle, from among the measured azimuth angles, and measures a dip angle of a current status, resulting in the most accurate azimuth angle most suitable for the current environments.

As apparent from the above description, a method for searching for a dip angle using a tilt-compensated electronic compass according to the present invention finds a dip angle suitable for current environments before detecting an azimuth angle, and thereby acquires a more accurate azimuth angle from the electronic compass having a two-axis geomagnetic sensor on the basis of the found dip angle.

In other words, the dip angle search method according to the present invention can acquire a more accurate azimuth angle as compared to the conventional method for adapting the experimentally-acquired constant to the dip angle calculation process. The higher the tilted angle, the higher the error generated by a wrong dip angle. However, provided that the dip angle search method finds a dip angle of a current state and calculates an azimuth angle associated with the found dip angle, it can acquire a more accurate azimuth angle. If the dip angle search method is made available for a variety of mobile terminals, for example, PDAs (Personal Digital Assistants), and cellular and PCS phones, etc., a user can acquire the correct azimuth angle while viewing a display panel of his or her mobile terminal at an agreeable angle.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for finding an optimal dip angle in a prescribed environment using an electronic compass containing a two-axis geomagnetic sensor, comprising the steps of:
   a) setting a predetermined azimuth angle indicative of a horizontal status of a geomagnetic sensor to a reference azimuth angle "$\Psi$ref";
   b) if the electronic compass is slightly tilted on the basis of the reference azimuth angle "$\Psi$ref", stepwise-increasing a dip angle "$\lambda$" within a predetermined dip angle search range, and calculating azimuth angles "Ψmi" associated with individual dip angles;

c) comparing the calculated azimuth angles "Ψ" with the prescribed reference azimuth angle "Ψref", and finding one azimuth angle, which is the closest to the reference azimuth angle "Ψref", from among the calculated azimuth angles "Ψmi"; and d) setting the dip angle "λ" applied to the found azimuth angle to a specific dip angle associated with a corresponding azimuth angle.

2. The method as set forth in claim 1, wherein the step (b) for calculating the azimuth angles "Ψmi" includes the step of:

b1) stepwise-increasing the dip angle one-step at a time within a range from −90° to +90° (i.e., a dip angle search range of approximately "±90°") to calculate azimuth angles associated with individual dip angles.

3. The method as set forth in claim 1, wherein the step (b) for calculating the azimuth angles "Ψmi" includes the step of:

b2) stepwise-increasing the dip angle by approximately 1° within the predetermined dip angle search range, and calculating azimuth angles associated with individual dip angles.

4. The method as set forth in claim 1, wherein the step (b) for calculating the azimuth angles "Ψmi" includes the step of:

b3) stepwise-increasing the dip angle by approximately 1° within a range from −90° to +90° (i.e., a dip angle search range of approximately "±90°") to calculate azimuth angles associated with individual dip angles.

* * * * *